UNITED STATES PATENT OFFICE 2,647,819

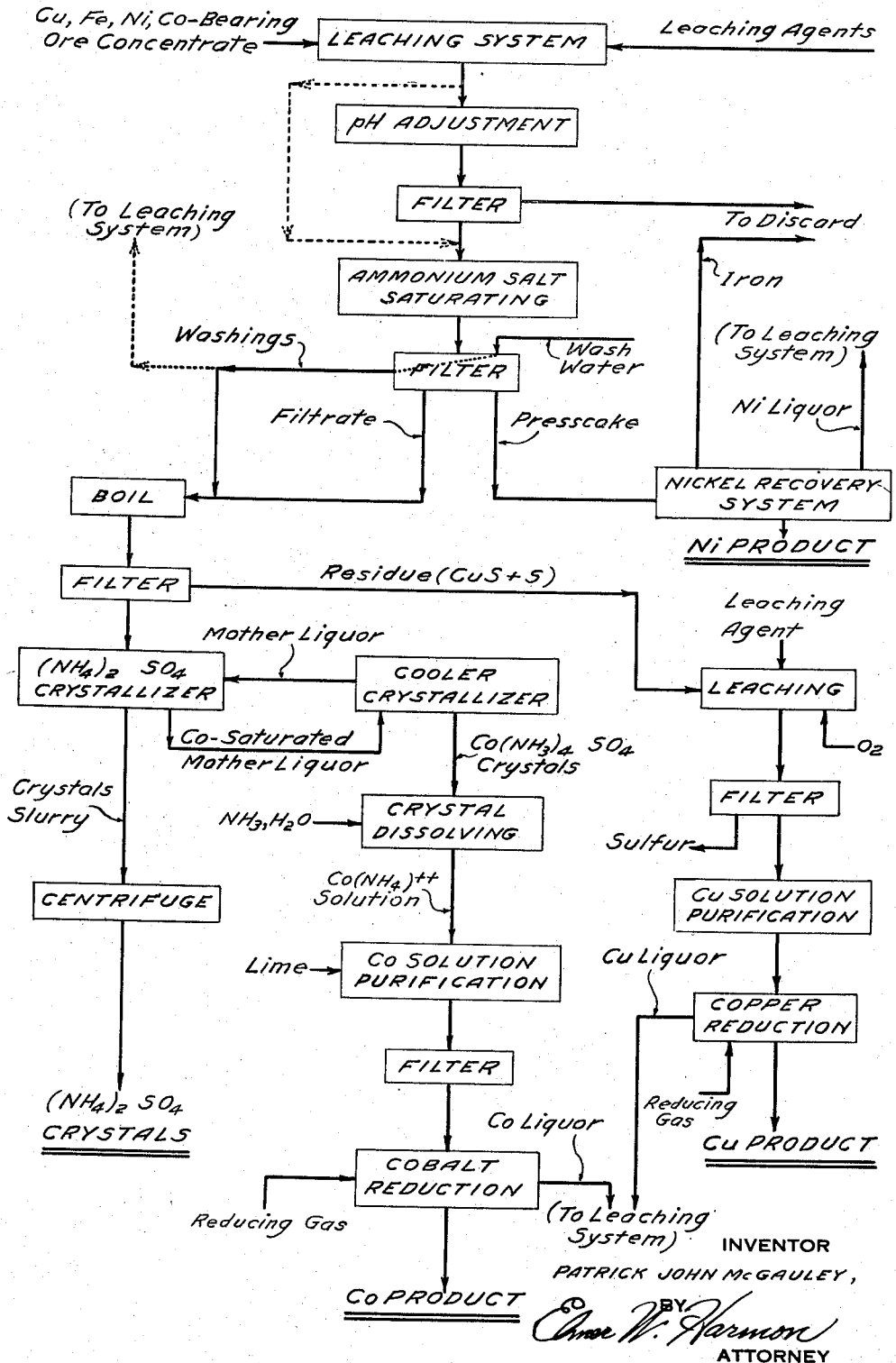

COPPER, COBALT, AND AMMONIUM SULFATE RECOVERY FROM MINERAL LEACH LIQUORS

Patrick J. McGauley, Glen Cove, N. Y., assignor to Chemical Construction Corporation, New York, N. Y., a corporation of Delaware Application June 4, 1949, Serial No. 97,228

5 Claims. (Cl. 23—117)

This invention is concerned with the production of metallic metals from mixed ore concentrates. It deals with processes in which, by leaching, the metals values of ore concentrates containing copper, cobalt and/or nickel are dissolved therefrom and subsequently recovered from the leach liquor. More specifically, it is concerned with the production of copper and of cobalt. In particular, it deals with the precipitation of the cobalt metal powder.

Although ores containing cobalt, copper and/or nickel in varying proportions are not uncommon, the presently available methods of isolating the various metals values thereof are not wholly satisfactory. Many ores which it may be desirable to treat contain iron and the known procedures have no adequate provision to deal therewith. Some of the available processes are incapable of producing one or more of the metals in yields of adequate quantity and quality when the others are present. In almost all the known procedures, the economics of the necessary operations result in production costs higher than are desirable.

It is, therefore, the principal object of the present invention to devise a simple and straightforward method for the production of cobalt in good yield and high quality from ores which contain copper and/or nickel and/or iron. The metal product should be of sufficiently high quality to meet commercial qualifications and the production should not be limited to the use of the undesirable steps found necessary in the current operations. Such a process should not be dependent upon any particular type of ore. It should not require roasting and/or electrical precipitation. It should not require excessively complicated process steps requiring an unusual degree of supervision nor should it require unusual reagents or the use of extraordinary equipment.

In general, the process requirements of the present invention have been met in a straightforward operation. A suitable ore concentrate containing cobalt, usually accompanied by copper and nickel and in some cases iron, is leached by a suitable known method to place the cobalt content in solution. The leach liquor will also contain the copper, the nickel if any is present, and for certain types of leaching, the iron if any is present. Iron is eliminated from the leach liquor as waste. A high concentration of ammonium sulfate is formed in the liquor and nickel is quantitatively precipitated therefrom as a nickel ammonium sulfate double salt.

The particular process of the present application deals with the filtrate, i. e., the iron- and nickel-free residual liquor. The latter is treated as by boiling, etc., to precipitate the copper content as copper sulfide. The copper-free liquor is treated to separate out ammonium sulfate crystals and build up the cobalt salt concentration. Finally, cobalt ammonium sulfate double salt is crystallized from the concentrated cobalt liquor, redissolved and finally cobalt metal is precipitated.

While presumably ores in which cobalt minerals are the principal constituents may exist, they are certainly rare and do not represent the problems which must be overcome in an average operation. The average original ore will fall within the class of materials discussed above. Because this is the most common situation, the treatment of such mixed ore concentrates is taken as illustrative.

Further, because the bulk of most ores constitute gangue diluents, effective operation requires elimination of the latter. Accordingly, in average practice the original ore is treated in some way to reduce the gangue content. This may be accomplished in known ways, which form no part of the present invention, as by gravity concentration and/or froth flotation and the like. In discussing the present process it is assumed that some such operation has been carried out and its is the resultant concentrate which is to be treated.

One or more of the metals may be present as an oxidized mineral although the greater part are usually sulfide minerals. It is desirable, therefore, to be able to treat both oxidized and sulfide minerals. It is an advantage that the process of the present invention is readily adaptable to the treatment of both. Because the problems involved are typical, a concentrate containing copper, iron, cobalt and nickel will be used as illustrative in this discussion.

In order to more easily understand the flow of the present invention, reference is made to the accompanying drawing. The latter constitutes a simplified flowsheet showing the major steps with which the present invention is concerned and their relation to the treatment of the remainder of the ore.

Leaching procedures to place the metal values of such an ore concentrate in solution also form an art which is highly developed. So far as the metallic nickel preparation of the present invention is concerned, the exact leaching procedure used may be widely varied. Perhaps the most common procedures involve either acid, usually sulfuric, or ammoniacal leaching, with or without concurrent oxidation, depending upon the oxides and sulfides content of the ore being treated. The present invention is applicable to an ore being treated by any of such procedures.

Because the invention is not limited to a particular type of leaching, in the drawing this operation has been designated generically as a "leaching system." Leaching is ordinarily carried out in some multiple tank system, the exact arrangement of which is not a critical factor in this application. The copper-, iron-, cobalt-, and nickel-bearing concentrate is fed thereto, and is treated therein with one or more suitable leaching agents. These may be any suitable acid or ammoniacal leaching liquors and they are used in a known manner. Several different leaching methods are well known.

The residual barren solids may be passed to waste. In most cases they will contain the gangue diluents. In addition, where ammoniacal or other leaching liquors of high pH are used the iron will report here. Any iron which may have been oxidized will be precipitated as ferric oxide or hydroxide, insoluble at the high leaching pH.

A leach liquor containing the dissolved metal values is drawn from the leaching system. In using most types of acid leaching, particularly where oxidation is employed, there will be a considerable content of dissolved iron. This must be eliminated from the solution. I have found that the iron can be caused to precipitate from a concentrated ammonium salt solution at a suitable pH while keeping the other metal values in solution.

Accordingly, the pH of the pregnant leach liquor is adjusted to about 3–4. Because of the oxidation which is a normal step of average operation up to this point, the dissolved iron will be in the ferric condition. At these pH's, it will precipitate and may be filtered out as oxide or hydroxide and passed to waste.

Neutralization may be carried out in any desired manner. For example, it may be done by the addition of ammonia to a sulfuric acid leach liquor or by the addition of sulfuric acid to, or by the formation of sulfuric acid in situ in, an ammoniacal leach liquor. Where the problem of iron is not involved, this pH adjustment and the removal of the resultant iron precipitate may be eliminated if so desired. This is indicated in the flowsheet as an optional flow by a dotted line.

Further, in accordance with the work done in developing the present invention, it was found that at a pH of about 4.0–6.4 in a concentrated solution of ammonium sulfate the nickel content of a solution can be precipitated quantitatively as a nickel-ammonium sulfate double salt. At the same time, other metals, i. e. the cobalt and copper in the illustrative case, can be retained in solution. Accordingly, the iron-free, metals-bearing leach liquor is treated to bring it into this condition.

Whether a sulfuric acid leach or an ammoniacal leach is used, any pH adjustment, i. e., that performed previously to remove iron and/or that done at this point to precipitate the nickel double salt will result in the formation of a considerable amount of ammonium sulfate. This will usually be sufficient for the purposes of the present invention. If not, additional preformed ammonium sulfate may be added. This latter causes no particular problem since, as will be brought out below, ammonium sulfate is one of the usual products of the process.

The resultant slurry is filtered to separate out the precipitated double salt. Ordinarily the presscake is washed. The washings may be either added to the filtrate or, if so desired, optionally returned to the leaching system. The filtrate and the double salt presscake are separately treated.

Nickel values, which are contained in the presscake, are recovered in a nickel recovery system. The latter, which forms no part of the present invention, may be operated in any desired manner. Accordingly, it is simply designated under the generic term "nickel recovery system." An excellent system for the purpose forms the subject-matter of my copending application for United States Letters Patent, Serial No. 97,227, filed of even date. So far as operating the process of the present invention is concerned, it is sufficient to note that such a system produces a nickel product, preferably as precipitated metal powder, and a nickel-bearing mother liquor. The latter is recycled, ordinarily to the leaching system. In some cases there may be an iron salt, or iron oxide or hydroxide discard.

Treatment of the filtrate and washings constitutes the primary feature of the present application. With or without all or a part of the washings, it is boiled for a sufficient time to precipitate the copper content as copper sulfide. Colloidal sulfur will ordinarily be conjointly precipitated. The copper precipitation may be considered as complete for all practical purposes. Accordingly, the slurry is filtered and the solid residue which comprises the presscake is sent to a copper treating cycle. The filtrate will contain ammonium sulfate which is separated out and recovered. Cobalt, if any is present, is isolated from the filtrate in a cobalt recovery cycle. These three operations constitute the filtrate treatment which is the subject of the present invention.

While it is possible to treat the copper sulfide-sulfur presscake by other means, an adequate and suitable procedure has been developed in the present process in accordance with the following steps. The residue is leached to redissolve the copper content. This may be carried out with any suitable leaching agent. While for most purposes it may be desirable to use aqua ammonia, it is feasible if so desired to use acidic leaching. In either case, concurrent oxidation by oxygen and/or air is desirable.

Again the operating temperature and pressure used to convert sulfides to sulfates during leaching is not critical and affects primarily the time required. The operation may be carried out, therefore, in any suitable vessel at any convenient temperature and pressure. Where an acid leaching is used it may be desirable to bleed steam from the operation in order to prevent the temperature and pressure rise from becoming excessive due to the exothermic reaction. About 325° C. will ordinarily constitute a practical upper temperature limit under these conditions. While higher temperatures may be used, if desirable or necessary, they may require stronger apparatus than is usually available.

After leaching, regardless of the nature of the leaching agent, the slurry is filtered to remove the sulfur and any other solids which may be present. Sulfur may be recovered as a saleable product, if so desired, by melting, filtering and cooling. The resultant copper-bearing liquor may vary considerably in purity. If sufficiently pure, it may be passed directly to a copper reduction cycle. However, the eventual production of copper metal powder in high quality requires precipitation from quite pure copper liquor if the yield in any one cycle is to be practical. Accordingly, wherever necessary, the copper solution, after the sulfur and solids removal is purified.

Purification of the copper solution may take any one of a number of forms. While other treatments may be used, a preferred procedure is to crystallize the copper content as copper sulfate. This may require elimination of part of the water and a pH adjustment in some cases. A heated, substantially saturated solution is prepared and the copper salt thrown out of solution by cooling and collected. The resultant copper sulfate is redissolved and subjected to treatment to precipitate the copper content as metal powder.

Like the copper solution purification, the reduction may be carried out in any suitable way. The copper solution is preferably combined with sufficient low-grade copper metal to insure reduction of all cupric ions to the cuprous condition and the mixture is saturated with a reducing gas such as carbon monoxide. The resultant slurry is then treated under increased temperature and pressure in a reducing gas atmosphere to complete the reduction of copper to a metallic condition.

Since the product powder, in order to be commercially desirable, must be at least 99.9% pure, with the possible exception of silver and oxygen, precipitation must not be carried beyond the stage where any precipitatable extraneous metal ions in the solution approach a 1:1 ratio with the copper in solution. Where precipitation is from an acid solution, it is ordinarily desirable to stop the precipitation at about 70% precipitation of the available copper although if the solution is known to be sufficiently pure, precipitation may be carried much further. When precipitation is from basic ammoniacal liquor, a larger amount of copper is preferably left in the mother liquor in order to provide copper-ammonium complex ions for the next leach cycle. Only about 20–40% of the available copper ordinarily will be precipitated from such liquors.

The copper metal powder product is separated out and collected. Any residual copper solution other than that required in the next succeeding purification and reduction steps is recycled to the leaching system. There is no eventual loss of copper and for the average cycle a mol of copper product is obtained for each mol of copper dissolved from the concentrate. For this reason, also, it is desirable that the same type of leaching agents be used in the copper precipitation cycle as was used in the original leaching system although this is not a necessary limitation on the overall process.

Filtrate, after removal of the copper sulfide-sulfur residues, is sent to an ammonium sulfate crystallizer. This may operate in a conventional manner, utilizing a temperature differential and/or evaporation to precipitate ammonium sulfate crystals. The latter are removed and collected by some conventional means such as a centrifuge or the like, and constitute one of the saleable products. Product ammonium sulfate may be used if desired or necessary in the above-noted nickel double salt precipitation.

As was noted above, cobalt, if present, is in the copper-free filtrate from which the ammonium sulfate is crystallized. With most ores the cobalt content of this filtrate initially will be too low to be separated practically from the ammonium sulfate solution by crystallization. This will be almost necessarily so where nickel has been initially removed because the cobalt and copper ratios with respect to the nickel and the amount of ammonium sulfate in solution will have been maintained at values at which the cobalt remains entirely dissolved.

Accordingly, ammonium sulfate crystallization is at any one time carried only to the extent that no cobalt salt will be precipitated therewith. The cobalt content is thus built up until it approaches the content at which crystallization of cobalt salt will begin at the operating temperature. At this cobalt content, mother liquor is drawn from the ammonium sulfate crystallizer to a cooler-crystallizer in which cobalt-ammonium sulfate double salt can be dropped from solution with a minimum content of ammonium sulfate per se. The residual liquor is returned to the ammonium salt crystallizer.

In starting up operations, mother liquor is ordinarily not passed through the cooler-crystallizer until the cobalt content is built up to a concentration at which precipitation of cobalt-ammonium sulfate occurs. Mother liquor of reduced cobalt content is returned to the ammonium sulfate crystallizer. Some ammonium sulfate will crystallize with the cobalt double salt.

Preferably, but not necessarily, this operation is carried out at a pH of about 3.5–5.5 under which conditions cobalt is present as a cobalt-ammonium sulfate double salt and the latter can be precipitated as completely insoluble in a sufficiently concentrated ammonium sulfate solution. Under the operating conditions this ammonium sulfate content is present.

Precipitated cobalt double salt crystals are collected and redissolved. This should be done by adding sufficient ammonia or aqua ammonia to produce a pH above 5.5, at which values the cobalt-ammonium complex ion forms and the cobalt-ammonium double salt is completely dissolved and converted to this condition.

If the amount of ammonium sulfate and/or other impurities may be considered to be negligible, the resultant solution may be passed directly to a cobalt reduction step. However, this seldom occurs. Accordingly, the cobalt-ammonium complex salt solution usually is subjected to one or more purification operations. For example, lime is ordinarily added to precipitate the excess sulfate ions as calcium sulfate which are removed by a suitable filter. If so desired, the cobalt-ammonium complex salt may be further purified either per se or after conversion to cobalt sulfate by crystallization. Ordinarily, this will not be necessary.

Finally, the purified cobalt solution is subjected to reduction. This is carried out in a solution saturated with a reducing gas such as carbon monoxide at any convenient temperature and pressure. It is an important feature of the present invention that this precipitation and reduction is preferably carried out from a solution of the cobalt as cobalt-ammonium complex ions. It cannot be effectively carried out from any other solution unless provision is made to eliminate the hydrogen ions formed during reduction.

Precipitation is carried out only to the extent that the cobalt is precipitated in sufficient purity.

It is easily possible to precipitate metal powder of 99.0% purity, except for oxygen. Precipitation should not be carried beyond the point at which any precipitatable extraneous ions begin to approach a 1:1 ratio with cobalt in solution. In most cases substantially all the cobalt can be precipitated because of the preceding elimination steps. The residual cobalt-containing liquor is ordinarily recycled to the leaching system.

In the general operation of the overall process, it is necessary at two stages to precipitate a metal-ammonium sulfate double salt from a solution concentrated in ammonium sulfate. The first occurs in eliminating the nickel, the last in separating cobalt salt from solution. In crystallizing the nickel double salt it should be noted that the copper and cobalt salts must be retained in solution. It may, therefore, be necessary in some cases to be careful that the various metal to metal ratios and ammonium sulfate concentrations be kept within limits which permit this. In subsequently crystallizing the cobalt salt, no special precautions ordinarily will be required.

Assigning numerical limitations is not readily accomplished. At a pH of about 6.4, the $Ni^{++}$ ion becomes a nickel-ammonium complex such as $Ni(NH_4)_x^{++}$, where $x$ is 2–4, depending on the available ammonia. Below a pH of about 4.0, the double salt does not form. In the case of cobalt, the corresponding pH values are about 5.5 and 3.5 respectively. It is necessary for best results that the double salt be precipitated under these conditions.

Similarly, it is not feasible to assign a definite value to the amount of ammonium sulfate that should be present. It will obviously be affected by temperature. If about 25° C. is taken as illustrative, the nickel double salt is soluble to less than 1% by weight, in a solution containing about 9–10% ammonium sulfate and insoluble in solutions of more than about 16–17% ammonium sulfate. At these ammonia salt concentrations, the cobalt salt is soluble from about 6% down to about 1.3% respectively and the copper salt at from about 10% down to about 2%.

The solubility of cobalt and copper obviously decreases with increasing ammonium salt concentration. At the same temperature, cobalt salt becomes insoluble at about 40% ammonium salt concentration but copper remains soluble in appreciable amounts to above 50% ammonium salt concentration. Accordingly, during nickel precipitation it is undesirable to increase the ammonium salt concentration to greatly above the minimum for nickel insolubility. In some cases the copper-nickel or cobalt-nickel ratios may be higher than permissible for precipitation of nickel-double salt free from copper and cobalt. The liquor is then diluted with respect to the copper and cobalt content sufficiently to retain these metals in solution. The ammonium salt content may be adjusted if necessary after such dilution.

In the subsequent precipitation of the cobalt double salt this does not create a problem. The solution is substantially saturated with ammonium sulfate and will be saturated at the cobalt precipitation temperature.

I claim:

1. In the treatment of solutions obtained by oxidation leaching of sulfur-bearing mixtures containing cobalt, copper and at least one "metal" selected from the group consisting of iron and nickel whereby sulfates of metal values are dissolved, the method of separating the cobalt content of the solution, which comprises: adjusting the pH of the solution to about 3–4 whereby any ferric iron present is precipitated; removing solids from the solution; producing in the solids-free solution a pH of from about 4–6.5 and adjusting the sulfates content to the equivalent of solutions at about 25° C. containing concentrations of (a) copper and cobalt sulfates ranging from not over about 10% and 6%, respectively, at about 10% ammonium sulfate and about 2% and 1.3% respectively at about 20% ammonium sulfate, and (b) ammonium sulfate of at least 9% at which substantially all the copper and cobalt remain in solution and substantially all dissolved nickel precipitates as nickel sulfate-ammonium sulfate double salt; removing any precipitated nickel double salt; heating the residual solution sufficiently to precipitate substantially all the copper values and removing the precipitated values of copper; concentrating residual liquor to crystallize ammonium salt therefrom, continuing ammonium salt crystallizing until the cobalt salt content approaches the saturation point at the operating temperature; removing the ammonium salt crystals; and withdrawing and cooling concentrated cobalt mother liquor whereby cobalt salt is crystallized, collecting the cobalt salt crystals and returning the residual mother liquor to the ammonium salt crystallizing to be further concentrated in cobalt.

2. A process according to claim 1 in which after nickel removal the pH is maintained at about 3.5–5.5, whereby cobalt is crystallized as cobalt sulfate-ammonium sulfate double salt.

3. In the treatment of solutions obtained by oxidation leaching of sulfur-bearing mixtures containing nickel, cobalt and copper whereby sulfates of metal values are dissolved, the method of separating the cobalt content of the solution which comprises: adjusting the pH of the solution to from about 4–6.5 and the sulfates content to the equivalent of solutions at about 25° C. containing concentrations of (a) copper and cobalt not over about 10% and 6% respectively at about 10% ammonium sulfate and 2% and 1.3% respectively at about 20% ammonium sulfate, and (b) ammonium sulfate of at least 9%, at which substantially all of the copper and cobalt remain in solution and substantially all nickel precipitates; removing any nickel-bearing precipitate; heating the residual solution sufficiently to precipitate substantially all of the copper values and removing the precipitated copper values; adjusting the pH of residual liquor to about 3.5–5.5 and maintaining this acidity; concentrating adjusted liquor to crystallize ammonium salt therefrom, continuing ammonium salt crystallizing until the cobalt sulfate-ammonium sulfate double salt content approaches the saturation point at the operating temperature and collecting resultant ammonium salt crystals; and continuously passing concentrated cobalt mother liquor to a cobalt cooler-crystallizer, whereby cobalt-ammonium sulfate double salt is crystallized, collecting cobalt salt crystals and returning residual mother liquor to the ammonium salt crystallizing to be further concentrated in cobalt.

4. In separating cobalt from an aqueous solution containing sulfates of cobalt in minor and ammonium in major amounts, the steps which comprise: adjusting the pH to from about 3.5 to 5.5 and removing water sufficiently to cause crystallization of ammonium sulfate; continuing said concentration and crystallization until the dissolved cobalt content approaches the cobalt sulfate-ammonium sulfate double salt saturation point at the operation temperature; removing the ammonium sulfate crystals; withdrawing and cooling cobalt-concentrated mother liquor sufficiently to precipitate at least part of the dissolved cobalt and ammonium sulfate double salt, collecting precipitated salt and returning the residual mother liquor to the ammonium sulfate concentration step for further cobalt concentration.

5. In separating cobalt from an aqueous ammoniacal ammonium sulfate solution containing sulfates of cobalt in minor amounts, the steps which comprise: adjusting the pH to from about 3.5 to about 5.5 and removing water sufficiently to cause crystallization of ammonium sulfate; continuing said concentration and crystallization until the dissolved cobalt sulfate-ammonium sulfate double salt content approaches its saturation point at the operation temperature and removing the ammonium sulfate crystals; withdrawing and cooling cobalt-concentrated mother liquor sufficiently to precipitate at least part of the dissolved cobalt and ammonium sulfate double salt, stopping the cooling when cobalt precipitation becomes inefficient, collecting precipitated salt and returning residual mother liquor to the ammonium sulfate crystallizing step for further cobalt concentration in admixture with additional amounts of said first named sulfate solution.

PATRICK J. McGAULEY.

References Cited in the file of this patent

UNITED STATES PATENTS

| Number | Name | Date |
|---|---|---|
| 1,686,391 | Muller et al. | Oct. 2, 1928 |
| 2,356,183 | Shepard et al. | Aug. 22, 1944 |
| 2,520,958 | Poole et al. | Sept. 5, 1950 |
| 2,526,707 | Stahl | Oct. 24, 1950 |
| 2,576,314 | Forward | Nov. 27, 1951 |